2 Sheets—Sheet 1.

O. J. SMITH.
Device for Feeding Stock.

No. 208,544. Patented Oct. 1, 1878.

Witnesses:
J. W. Garner
A. D. Haines

Inventor:
O. J. Smith
per
F. A. Lehmann, atty

2 Sheets—Sheet 2.

O. J. SMITH.
Device for Feeding Stock.

No. 208,544. Patented Oct. 1, 1878.

Witnesses:
J. W. Garner
W. S. D. Haines

Inventor:
O. J. Smith,
per
J. A. Lehmann
atty

UNITED STATES PATENT OFFICE.

ORSON J. SMITH, OF FARMER CITY, ILLINOIS.

IMPROVEMENT IN DEVICES FOR FEEDING STOCK.

Specification forming part of Letters Patent No. 208,544, dated October 1, 1878; application filed May 18, 1878.

*To all whom it may concern:*

Be it known that I, ORSON J. SMITH, of Farmer City, in the county of De Witt and State of Illinois, have invented a new and Improved Granary; and I do hereby declare that the following is a full, clear, and exact description of the same.

My invention relates to an improvement in granaries; and it consists in the peculiar arrangement and combination of parts that will be more fully described hereinafter, and referred to in the claim, whereby the grain from the bin can be fed to the stock below in any desired quantities.

Figure 1:
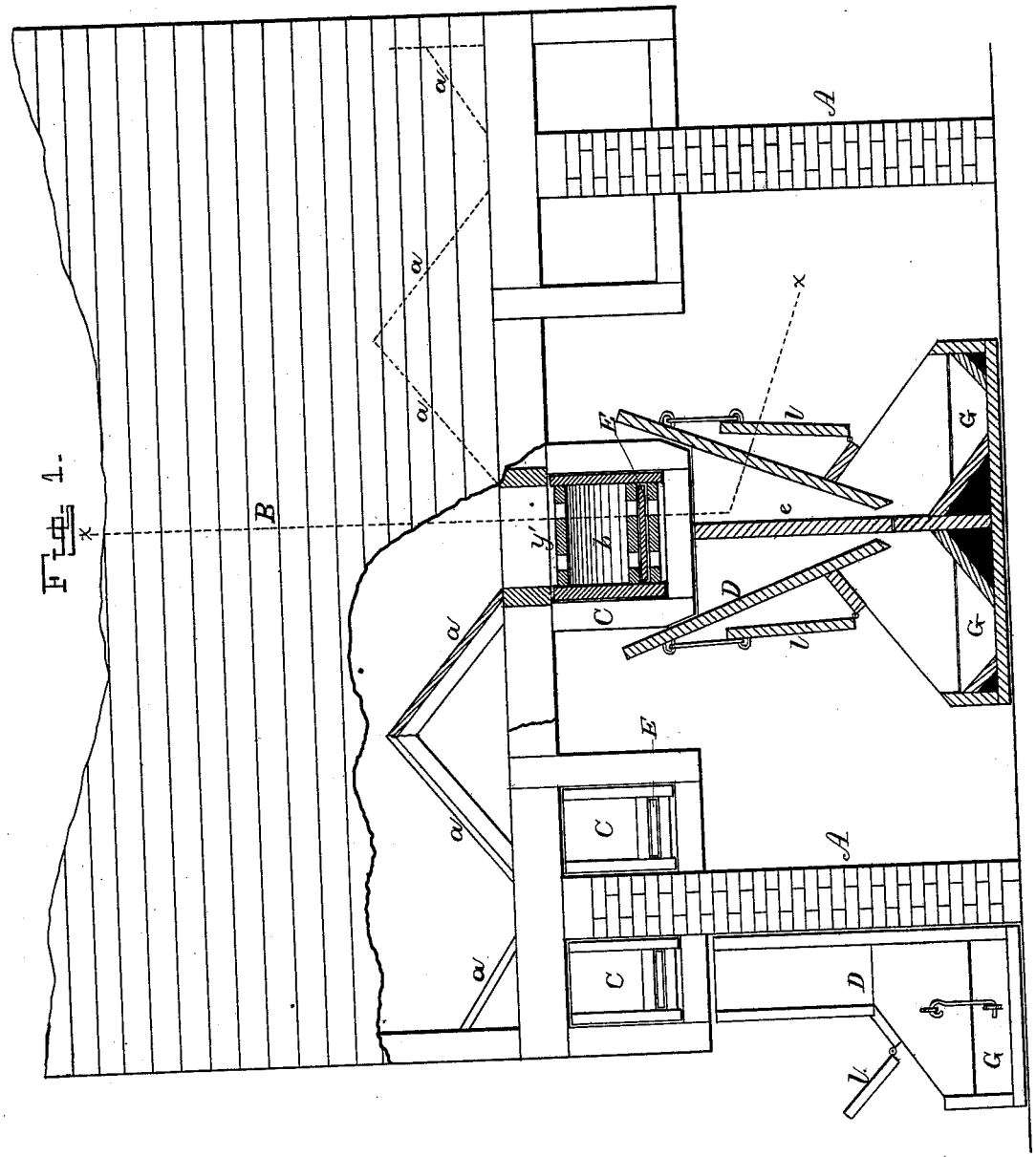
Figure 2:
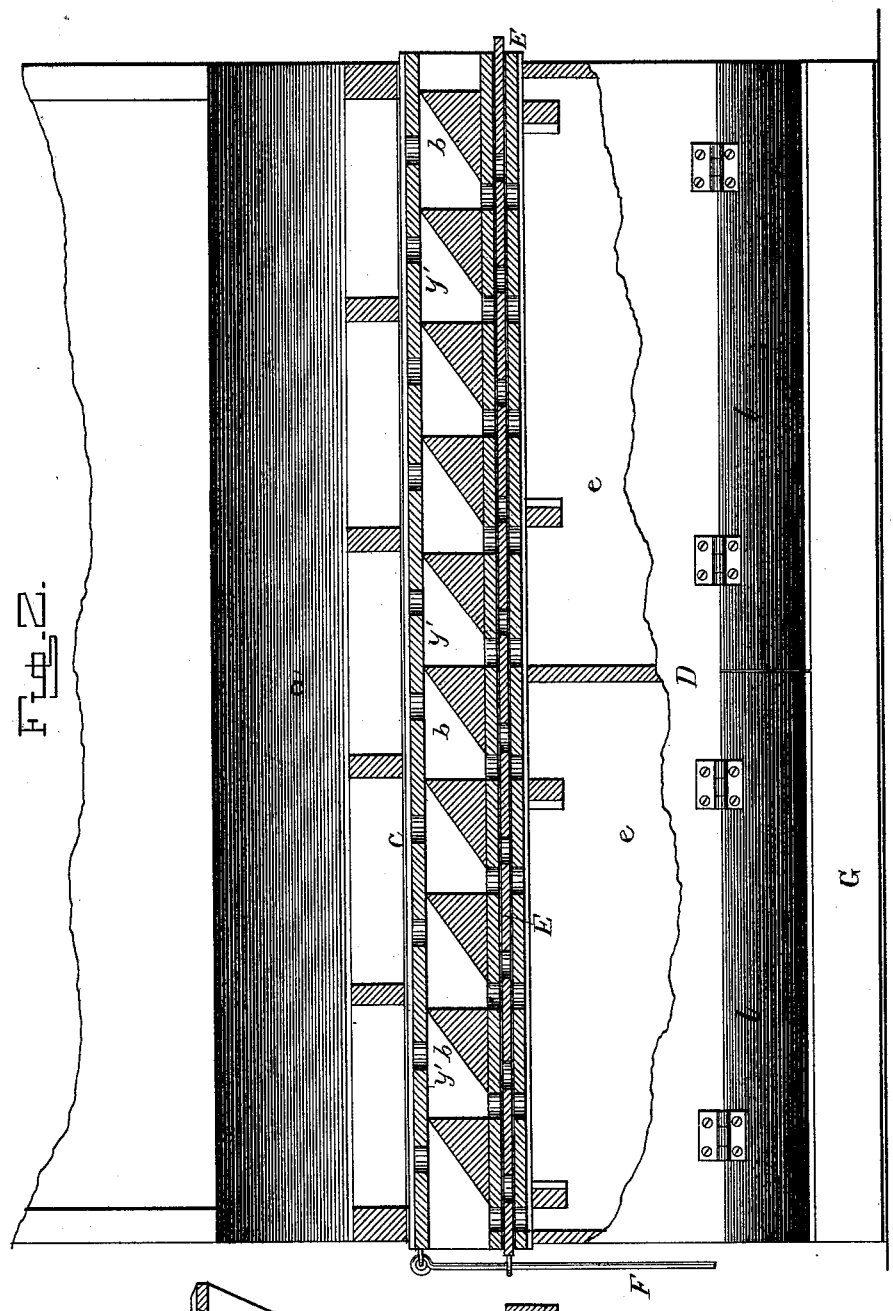
Figure 3:
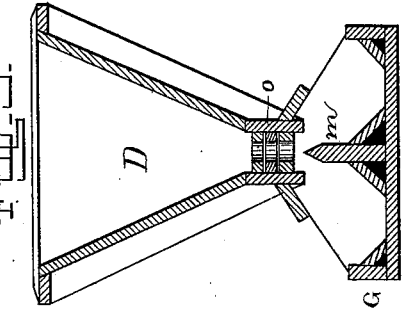

Figure 1 is an end elevation, partly in section. Fig. 2 is a longitudinal section taken on the line $x\ x$, Fig. 1. Fig. 3 is a vertical cross-section of a modified form of a hopper.

A A represent the two base-walls upon which the wooden bin B is built, the ends of the bin being made to project some distance beyond the walls, as shown. The floor of the bin consists of a number of inclined planes, $a$, so as to cause the whole of the grain to flow down into the seed-boxes C, formed at the bottoms of the inclines. These seed-boxes will be made to extend from one end of the bin to the other, both in between the walls A and outside, and under each box will be placed a single or double trough, G. Between the bin and the top of each seed-box is placed the perforated board $y'$, through which the grain flows into the boxes. The box is provided with a perforated double bottom, and lying between these bottoms is the perforated slide E, which is connected to an operating-lever, F, so that the flow of grain into the trough G below can be regulated at will.

The several seed-boxes in the series are alike in construction and dimension, each having a sloping bottom, and at the lowest point of the bottom a hole, through which the grain passes downward into the trough G. The gist of my invention lies in the fact that the sloping floors of the said boxes lie directly under the holes in the bottom of the granary B, in virtue of which the pressure of the column of grain extending downward from and through the bottom of the granary rests on the sloping bottoms of the seed-boxes. By this arrangement the slide E is free to a very considerable extent from any pressure from above, except that due to the short columns of grain extending downward from and through the bottom of the seed-boxes.

As the grain leaves the box it flows down into the hopper D of the trough G, which two parts are connected together by suitable hooks. The sides of the hopper are covered by doors $l$, which may be held in a raised condition by suitable hooks or catches while the animals are feeding.

In Fig. 1 the division-board $e$ is shown as extending high up; but should it be desired to insert a slide, $o$, in the bottom of the hopper this board will extend but little above the top of the trough.

Having thus described my invention, I claim—

In combination with the granary, the series of seed-boxes having sloping bottoms and holes, through which the grain may pass downward to the feed-trough, the arrangement of the series of boxes being such, substantially as described, that the hole in the bottom of each box shall lie in a vertical plane intermediate between the holes in the bottom of the granary, and the sloping bottom of each box shall lie directly under a hole in the bottom of the granary.

ORSON J. SMITH.

Witnesses:
REUBEN CLEARWATERS,
GEORGE W. HERRICK.